United States Patent
Létant et al.

(10) Patent No.: US 9,279,894 B2
(45) Date of Patent: Mar. 8, 2016

(54) SYSTEMS AND METHODS FOR NEUTRON DETECTION USING SCINTILLATOR NANO-MATERIALS

(75) Inventors: Sonia Edith Létant, Livermore, CA (US); Tzu-Fang Wang, Danville, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1355 days.

(21) Appl. No.: 13/024,066

(22) Filed: Feb. 9, 2011

(65) Prior Publication Data

US 2012/0199747 A1 Aug. 9, 2012

(51) Int. Cl.
- *G01T 3/06* (2006.01)
- *B82Y 15/00* (2011.01)
- *G01T 3/08* (2006.01)

(52) U.S. Cl.
CPC . *G01T 3/06* (2013.01); *B82Y 15/00* (2013.01); *G01T 3/08* (2013.01)

(58) Field of Classification Search
CPC .......... G01V 5/04; G01V 5/10; G01V 5/101; G01V 5/102; G01V 5/12; G01V 5/14; G01V 5/125
USPC .................. 250/370.11, 362, 370.05, 390.01, 250/269.2, 253, 265, 266, 361 R
See application file for complete search history.

(56) References Cited

U.S. PATENT DOCUMENTS

| | | | | |
|---|---|---|---|---|
| 3,988,586 A | * | 10/1976 | Stuart et al. | 250/390.11 |
| 4,217,496 A | * | 8/1980 | Daniels et al. | 250/369 |
| 4,217,497 A | * | 8/1980 | Daniels et al. | 250/369 |
| H000590 H | * | 2/1989 | Chiles et al. | |
| 5,155,366 A | * | 10/1992 | Miller | 250/368 |
| 5,336,889 A | * | 8/1994 | Hofstetter | 250/361 R |
| 5,446,286 A | * | 8/1995 | Bhargava | 250/361 R |
| 5,585,640 A | * | 12/1996 | Huston et al. | 250/483.1 |
| 6,207,953 B1 | * | 3/2001 | Wilson | 250/269.4 |
| 6,479,826 B1 | * | 11/2002 | Klann et al. | 250/370.05 |
| 6,727,504 B1 | * | 4/2004 | Doty | 250/390.01 |
| 6,876,711 B2 | * | 4/2005 | Wallace et al. | 376/154 |
| 6,909,098 B2 | * | 6/2005 | Bross et al. | 250/367 |
| 7,105,832 B2 | * | 9/2006 | Dai et al. | 250/390.11 |
| 7,196,333 B1 | * | 3/2007 | Gerstenmayer et al. | 250/370.1 |

(Continued)

OTHER PUBLICATIONS

Wang et al. ,FY05 LDRD Final Report Nanomaterials for Radiation Detection, Lawrench Livermore National Laboratory, UCRL-TR-218736, Feb. 7, 2006, pp. 1-6.*

(Continued)

*Primary Examiner* — David Porta
*Assistant Examiner* — Djura Malevic
(74) *Attorney, Agent, or Firm* — Zilka Kotab

(57) ABSTRACT

In one embodiment, a neutron detector includes a three dimensional matrix, having nanocomposite materials and a substantially transparent film material for suspending the nanocomposite materials, a detector coupled to the three dimensional matrix adapted for detecting a change in the nanocomposite materials, and an analyzer coupled to the detector adapted for analyzing the change detected by the detector. In another embodiment, a method for detecting neutrons includes receiving radiation from a source, converting neutrons in the radiation into alpha particles using converter material, converting the alpha particles into photons using quantum dot emitters, detecting the photons, and analyzing the photons to determine neutrons in the radiation.

15 Claims, 4 Drawing Sheets

(56) References Cited

U.S. PATENT DOCUMENTS

| | | | |
|---|---|---|---|
| 7,652,261 B1 | 1/2010 | Wilson et al. | |
| 7,857,993 B2* | 12/2010 | Dai et al. | 252/301.17 |
| 7,977,643 B2* | 7/2011 | Weinberg | 250/370.01 |
| 8,177,998 B2 | 5/2012 | Dai et al. | |
| 2003/0178574 A1 | 9/2003 | Wallace et al. | |
| 2005/0067575 A1 | 3/2005 | Sane et al. | |
| 2005/0224720 A1* | 10/2005 | Dai et al. | 250/390.11 |
| 2006/0054863 A1* | 3/2006 | Dai et al. | 252/301.4 R |
| 2007/0085010 A1 | 4/2007 | Letant et al. | |
| 2007/0205891 A1* | 9/2007 | Spencer et al. | 340/539.29 |
| 2009/0014662 A1* | 1/2009 | Suhami | 250/390.11 |
| 2009/0179155 A1 | 7/2009 | Weinberg | |
| 2010/0019160 A1* | 1/2010 | Wallace | 250/370.03 |
| 2010/0019164 A1* | 1/2010 | Stephan et al. | 250/390.04 |
| 2010/0270462 A1* | 10/2010 | Nelson et al. | 250/252.1 |
| 2010/0327171 A1* | 12/2010 | Robinson et al. | 250/370.05 |
| 2011/0049379 A1* | 3/2011 | Moses | 250/390.01 |
| 2011/0163242 A1* | 7/2011 | Mao et al. | 250/390.01 |
| 2011/0266448 A1* | 11/2011 | Burgett et al. | 250/361 R |
| 2012/0119102 A1* | 5/2012 | Lorkovic | 250/390.01 |
| 2012/0228510 A1* | 9/2012 | Clonts et al. | 250/362 |
| 2013/0075718 A1* | 3/2013 | Nause et al. | 257/43 |
| 2013/0075848 A1* | 3/2013 | Nikolic et al. | 257/429 |

OTHER PUBLICATIONS

Wang et al., "ZnS quantum dot based nanocomposite scintillators for thermal neutron detection," 2010 Elsevier B.V., Nuclear Instruments and methods in Physics Research A, vol. 622, 2010, pp. 186-190.

Plumley et al., "Thermal neutron detectors based on gadolinium-containing lanthanide-halide nanoscintillators," 2010 SPIE, Proceedings of SPIE, vol. 7665, pp. 76651F/1-76651F/13.

Im et al., "Potential Application of Fabricated Sulfide-Based Scintillation Materials for Radiation Detection," Journal of Nanoscience and Nanotechnology, vol. 10, No. 1, 2010, pp. 170-174.

Pellegrin et al., "Radiation scintillator embedded with a converting medium to detect and discriminate the four species of ionizing radiation," Proceedings of SPIE, vol. 7665, 2010, pp. 766511-1/766511-9.

Waguespack et al., "CMOS Compatible Micro-Scintillators for Wireless Multi-Species Radiation Detection and Tracking," Proceedings of SPIE, vol. 7706, 2010, pp. 77060W-1/77060W-9.

Waguespack et al., "Glass and Quartz Microscintillators for CMOS Compatible Multi-Species Radiation Detection," 2009 IEEE, pp. 833-836.

Brown et al., "Chapter 8: Applications of Nanoparticles in Scintillation Detectors," 2008 American Chemical Society, pp. 117-138.

Kesanli et al., "Highly efficient solid-sate neutron scintillators based on hybrid sol-gel nanocomposite materials," Applied Physics Letters, vol. 89, 2006, pp. 214104-1/214104-3.

Letant et al., "Study of porous glass doped with quantum dots or laser dyes under alpha irradiation," Applied Physics Letter, vol. 88, 2006 (abstract only).

Letant et al., "Semiconductor Quantum Dot Scintillation under gamma-Ray Irradiation," Nano Letters, vol. 6, Aug. 30, 2006, pp. 1-14.

Burgess, S. B., "Quantum Dots May Enable New Radiation Detectors," Applied Physics Letters, Mar. 6, 2006, pp. 1-2.

* cited by examiner

000
SYSTEMS AND METHODS FOR NEUTRON DETECTION USING SCINTILLATOR NANO-MATERIALS

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to neutron detection, and more particularly, to using neutron-converting nano-materials with semiconductor quantum dots to form a scintillator medium for the detection of neutrons.

BACKGROUND

Present technology in neutron radiation detection suffers from both flexibility and scalability issues. For example, commonly used $^3$He-tube technology requires highly pressurized He gas, uses large amounts of voltage (more than 1000 V), is sensitive to microphonics, and relies on the use of $^3$He gas, for which there is a rapidly decreasing supply available, and typically is produced from the decay of tritium gas. Other technologies suffer from drawbacks. For example, nanofabricated $^{10}$B-coated solid state detectors suffer from scalability issues, and $^{6,7}$Li-doped sodium iodide (NaI) scintillators are plagued by poor neutron/gamma discrimination.

Therefore, neutron detection system/neutron detector and neutron detection methods which are capable of overcoming the shortcomings that plague currently used techniques, systems, and detectors would be very beneficial to the field of radiation detection.

SUMMARY

In one embodiment, a neutron detector includes a three dimensional matrix, having nanocomposite materials and a substantially transparent film material for suspending the nanocomposite materials, a detector coupled to the three dimensional matrix adapted for detecting a change in the nanocomposite materials, and an analyzer coupled to the detector adapted for analyzing the change detected by the detector.

In another embodiment, a method for detecting neutrons includes receiving radiation from a source, converting neutrons in the radiation into alpha particles using converter material, converting the alpha particles into photons using quantum dot emitters, detecting the photons, and analyzing the photons to determine neutrons in the radiation.

Other aspects and embodiments of the present invention will become apparent from the following detailed description, which, when taken in conjunction with the drawings, illustrate by way of example the principles of the invention.

DETAILED DESCRIPTION

Figure 1:
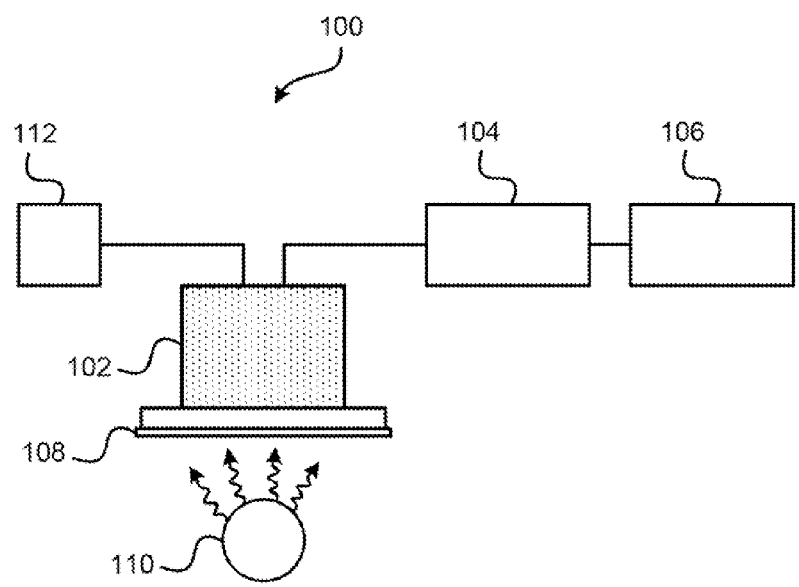
FIG. 1 shows an experimental setup for a proof of concept for a radiation detector system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

In one general embodiment, a neutron detector includes a three dimensional matrix, having nanocomposite materials and a substantially transparent film material for suspending the nanocomposite materials, a detector coupled to the three dimensional matrix adapted for detecting a change in the nanocomposite materials, and an analyzer coupled to the detector adapted for analyzing the change detected by the detector.

In another general embodiment, a method for detecting neutrons includes receiving radiation from a source, converting neutrons in the radiation into alpha particles using converter material, converting the alpha particles into photons using quantum dot emitters, detecting the photons, and analyzing the photons to determine neutrons in the radiation.

Recent advancements in nanotechnology have enabled the synthesis of materials with shapes and sizes controlled at the molecular level. Chemical composition can also be manipulated at the nanoscale, leading to radically new material properties due to a combination of quantum confinement and surface to volume ratio effects. One of the main consequences of reducing the size of semiconductors down to nanometer dimensions is that their energy band gap is increased, leading to visible luminescence, which suggests that these materials may be used as scintillators. The tunable visible band gap of semiconductor nano-crystals would also ensure both efficient photon counting through better coupling with photomultipliers optimized for the visible region, such as avalanche photodiodes (APDs) with up to 80% quantum efficiency (QE), and high photon output through smaller individual photon energy resulting in more photons produced at room temperature, which is essential for effective Poisson counting (the energy resolution $\Delta E/E$ is inversely proportional to the square root of the number of photons collected).

Although scintillation mechanisms in sodium iodide (NaI) are not completely understood at this time (its complex molecular band structure generates a non-linear response), it is expected that the particularly clean electronic band gap properties of quantum confined semiconductors will provide a linear photon output, while maintaining room temperature operation of the detector. Initial studies showed that semiconductor quantum dots may be embedded into a transparent matrix, such as porous glass or polymers, and generate a significant visible light output under both alpha and gamma irradiation. The energy resolution of the 59 keV line of $^{241}$Am obtained with a quantum dot-glass nanocomposite was compared to that of a standard NaI scintillator, experimentally demonstrating a factor of two improvement.

Neutron interactions with high cross section converter materials ($^3$He, $^6$Li, and $^{10}$B for thermal neutron and epithermal neutrons; Th and special nuclear materials for high energy neutrons) generate exothermal nuclear reactions producing energetic charge particles. For example, thermal neutrons will produce tritons and protons when interacting with $^3$He; will produce alpha particles and lithium when interacting with $^{10}$B; and will produce fission fragments when interacting with $^{235}$U.

The possibility of targeting neutron detection applications using boron nitride nanoparticles as the converter material and semiconductor quantum dots as the photon emitter was recently investigated. Preliminary results show that the new nanocomposite material converts neutrons into alpha particles, which are then converted into visible photons by the quantum dots. It is expected that the large surface to volume ratio obtained when using the converter material in the form of nanoparticles improves neutron/gamma discrimination since the recoil charged particles (from neutron interactions with the neutron converter materials) can only travel a few micrometers while gamma-ray interactions need large attenuation lengths (at least a few centimeters in thickness).

In one embodiment, nanocomposite materials are used as integrated neutron converters (boron nanoparticles) and scintillators (semiconductor quantum dots). Both converter and emitter materials may be synthesized and used in a form of dots or wires embedded in transparent matrices, such as polymers and glasses, in some approaches. One advantage of these new materials over standard neutron detectors is that scintillation in the visible range may be achieved due to the quantum confined nature of the emitters, allowing signal detection with efficient photodiodes (such as APDs) or photomultipliers (PMTs). In addition, the composite material may be produced in large areas and should preserve excellent neutron/gamma discrimination. Both converters and emitters may be synthesized on commercial scales and the cost of the scintillator device is expected to be significantly more attractive than that of nanofabricated platforms (it will be less expensive).

A proof of concept of the conversion of neutrons into visible photons using the mixed quantum dot boron nitride (BN) nanoparticle material was generated with an experiment described below. 100 mL of resin containing approximately 10 mg of cadmium selenide/zinc sulfide (CdSe/ZnS) core shell quantum dots (with emission centered at 540 nm) and 10 mg of BN nanoparticles per mL was cured on a glass microscope slide using UV-light. The BN nanoparticles were larger than the CdSe/ZnS quantum dots, with the BN nanoparticles measuring about 70 nm to about 100 nm in diameter. A thin film of coupling grease was applied prior to contacting the photomultiplier tube (PMT) probing a 2.5 cm diameter area on the glass slide of the sample. The sample-PMT assembly was electrically and optically insulated with black electronics tape and the alpha or neutron source (with moderators) was placed on the other side of the sample to demonstrate respective responses.

FIG. 1 shows an experimental setup for a proof of concept for a radiation detector system, according to one embodiment, with the PMT 102 being coupled to a light source 112, as well as being coupled to an amplifier 104 and a multichannel analyzer 106 for interpreting signals from the sample 108. The sample 108 included a polymer with CdSe/ZnS core shell quantum dots and the BN nanoparticles. Below the sample 108 was positioned an alpha or neutron-source 110.

Figure 4:
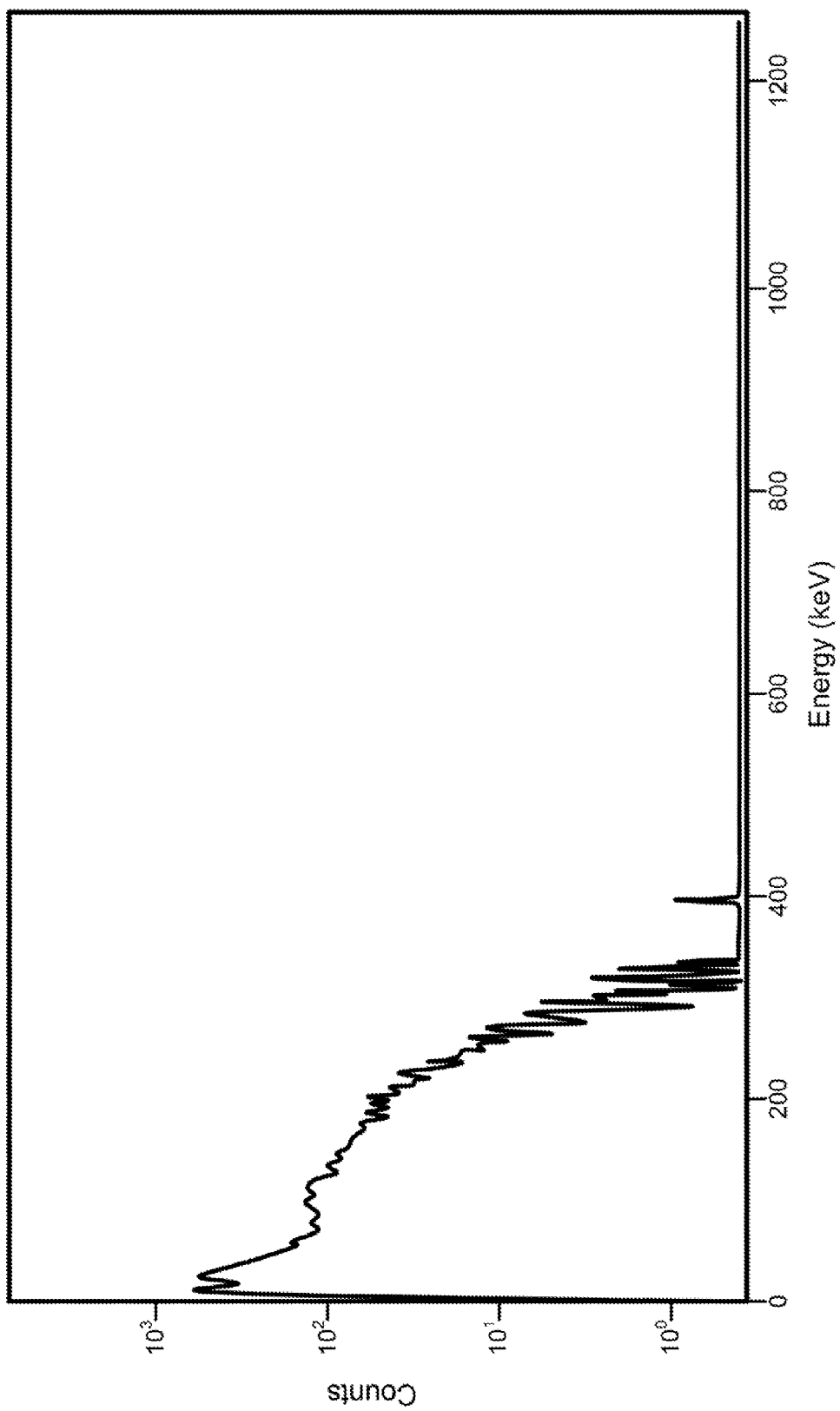
FIG. 4 shows a background-subtracted scintillation response of a nano-composite film, according to one embodiment, recorded with a 10 uCi $^{244}$Cm alpha source.
Figure 5:
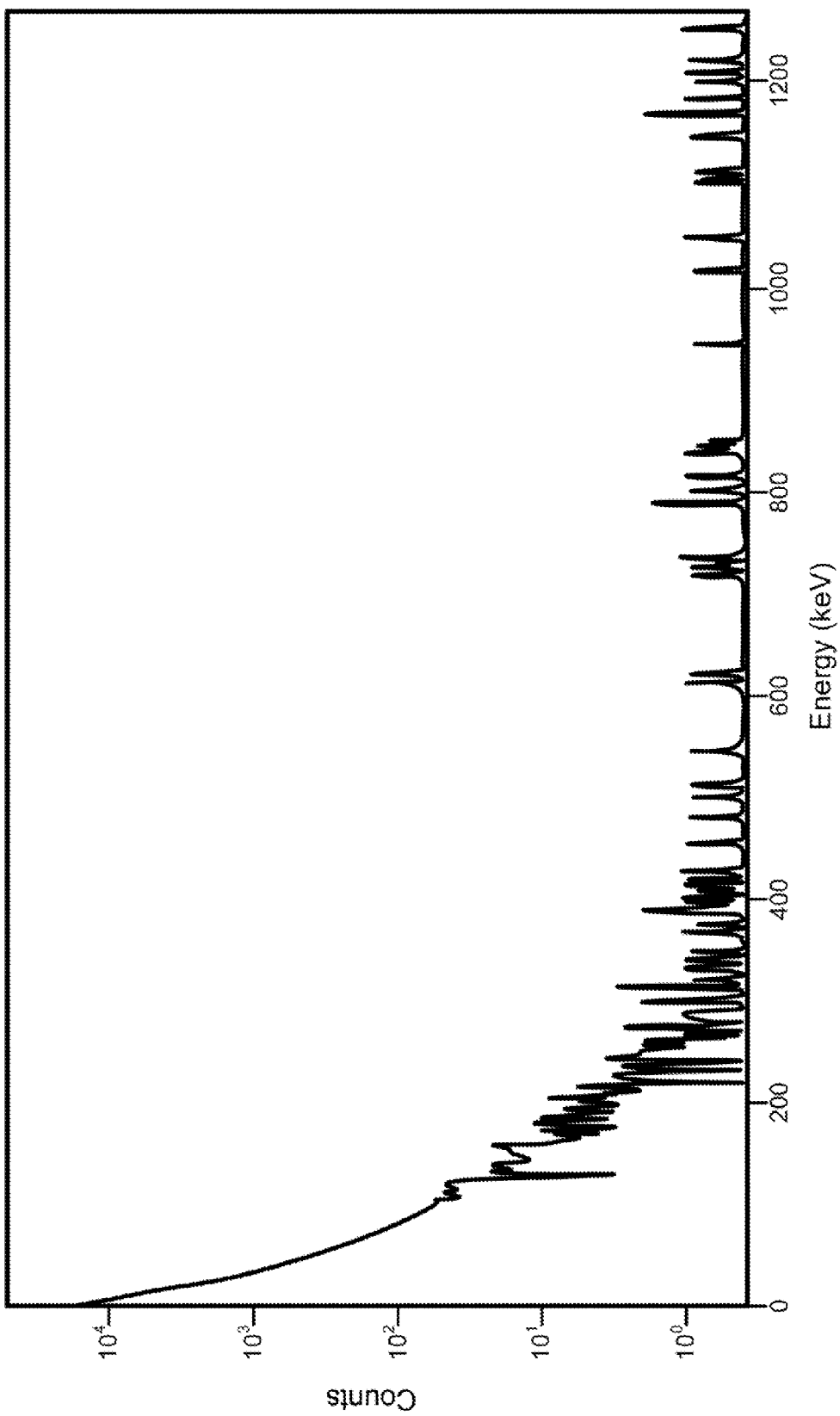
FIG. 5 shows a background-subtracted scintillation response of a nano-composite film, according to one embodiment, with a 1 ug $^{252}$Cf neutron source.

According to one embodiment, green photons emitted from a nanocomposite film 108 under neutron or alpha ray irradiation from an alpha or neutron-source 110 were integrated for 30 minutes with an amplifier 104 and a multichannel analyzer 106. FIG. 4 shows a background-subtracted scintillation response of a nano-composite film, according to one embodiment, recorded with a 10 uCi $^{244}$Cm alpha source. FIG. 5 shows a background-subtracted scintillation response of a nano-composite film, according to one embodiment, with a 1 ug $^{252}$Cf neutron source. This initial data demonstrates the conversion of neutrons into alpha particles by the boron nitride converters, and the conversion of the alpha particles into visible photons by the quantum dot emitters.

Since only a few microns are needed for efficient neutron conversion, appropriate optical transparency of the final composite material is attainable. In some embodiments, smaller boron nitride particles (having a diameter of no greater than about 10 nm) using 93% enriched $^{10}$B may be used, compared to the natural boron used for the proof of concept, which includes 19.9% of $^{10}$B (about a factor five less). These preliminary results provide a proof of concept of the scintillation of semiconductor quantum dots under neutron irradiation when mixed with boron nitride nanoconverters and illustrates the potential of this nanocomposite as a neutron detector.

Quantum dots and boron nitride particles embedded in a transparent resin were used as a test device, but other device configurations including solid or porous glass as a matrix may also be used. Designing neutron detectors based on nanomaterials has the potential to free the neutron detection research field from conventional technologies including $^3$He tubes and Li-doped NaI crystals, which both suffer from drawbacks, as previously described. Using nano-materials for the production of neutron detectors may lower costs, increase detector area, improve scintillation output, and improve visible scintillation wavelength.

To accomplish neutron detection, nano-techniques may be used to construct a neutron detector. One such structure is a neutron detector which includes a three dimensional matrix comprising nanocomposite materials, as shown in FIG. 2 according to one embodiment.

Figure 2:
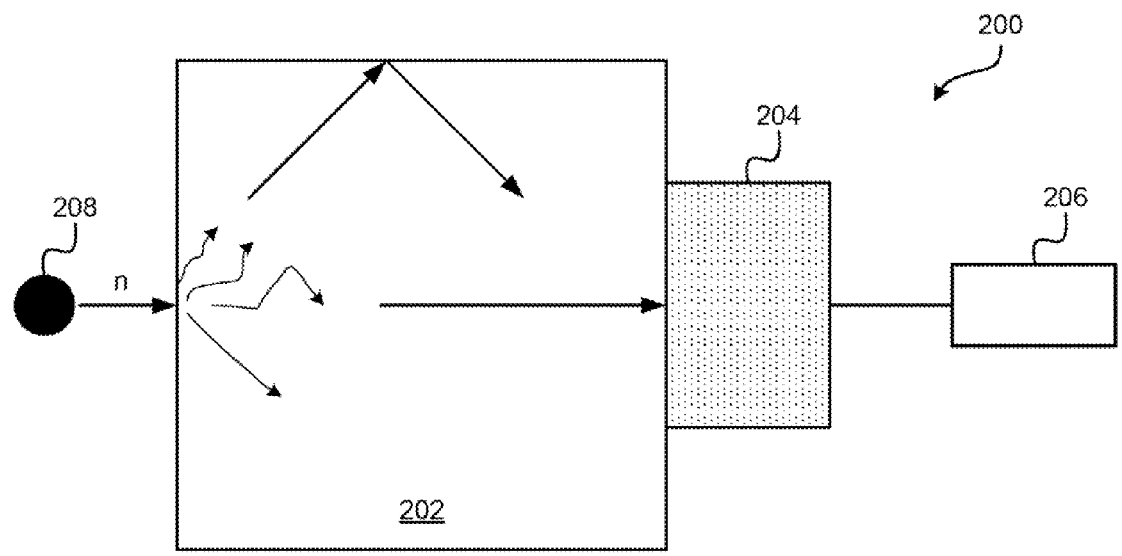
FIG. 2 shows a neutron detector, according to one embodiment.

As shown in FIG. 2, the neutron detector 200 includes a three dimensional matrix 202 comprising nanocomposite materials and a substantially transparent film material for suspending the nanocomposite materials, in one embodiment. The substantially transparent film material may comprise a glass, a polymer, or any other suitable material as would be known to one of skill in the art.

In addition, the neutron detector 200 includes a detector 204 coupled to the three dimensional matrix 202, and an analyzer 206 coupled to the detector 204. The detector 204 is adapted for detecting a change in the nanocomposite materials, and the analyzer 206 is adapted for analyzing the change detected by the detector 204, in some approaches.

The nanocomposite materials in the three dimensional matrix 202 may include converter materials and scintillator materials in one embodiment. The converter materials may act to convert neutrons into alpha particles, and the scintillator materials may act to convert alpha particles into photons, in several embodiments.

In one embodiment, the converter materials may comprise at least one material selected from a group consisting of: boron nanoparticles, compounds of boron nanoparticles including boron nitride (BN) nanoparticles and $^{10}$B nanoparticles and compounds thereof, lithium nanoparticles and compounds of lithium compounds including $^6$Li nanoparticles, etc.

In one approach, the converter materials may have a greatest dimension of between about 5 nm and about 500 nm, with the greatest dimension being any of a diameter, a height, a length, a width, etc.

According to another embodiment, the scintillator materials may comprise semiconductor quantum dots. In this embodiment, the semiconductor quantum dots may comprise at least one of: CdSe quantum dots, ZnS quantum dots, CdSe/ZnS core shell quantum dots, etc.

In other embodiments, the nanocomposite materials may comprise nanoparticles and/or nanowires partially covered with nanoparticles such as quantum dots, an array of nano-sized converter materials and scintillator materials, etc.

In more approaches, the semiconductor quantum dots may comprise any semiconductor material, such as cadmium zinc telluride (CZT), cadmium telluride (CdTe) and compounds thereof, gallium arsenide (GaAs) and compounds thereof, germanium (Ge) and compounds thereof, lead(II) sulfide (PbS), CdSe, ZnS, etc.

The CdSe quantum dots, in one approach, may be formed through a reaction of dimethylcadmium ($Me_2Cd$) with bis(trimethylsilyl)selenium (($TMS)_2Se$) in a dry, hot solvent, such as tri-n-octylphosphine oxide (TOPO) under an inert atmosphere, such as argon gas (Ar), neon (Ne), etc. Of course, any method of producing CdSe semiconductor quantum dots may be used, as would be known to one of skill in the art.

In cases where the three dimensional matrix 202 comprises CdSe semiconductor quantum dots, the CdSe semiconductor quantum dots may have preferred material characteristics, such as a diameter of between about 2 nm and about 5 nm, size distribution of about 2%, an emission wavelength that is visible, a life time of between about 5 ns and about 20 ns, and a quantum efficiency of about 70%, etc., in some approaches.

In preferred embodiments, the semiconductor quantum dots may have an emission in a visible light spectrum, thereby outputting visible photons, such as blue light, green light, red light, violet light, etc.

In some approaches, the detector 204 may be a PMT, an APD, or any other type of photon detector as known in the art. In fact, any type of photodiode may be used, according to various approaches.

The analyzer 206 may be a multi-channel analyzer, as would be understood by one of skill in the art upon reading the present descriptions.

As shown in FIG. 2, the source 208 emits a signal which impacts the three dimensional matrix 202 which acts as a scintillator and outputs photons, which then proceed toward the detector 204. The analyzer 206 interprets a signal from the detector 204, thereby providing an analysis of the source 208 material, in one embodiment.

Figure 3:
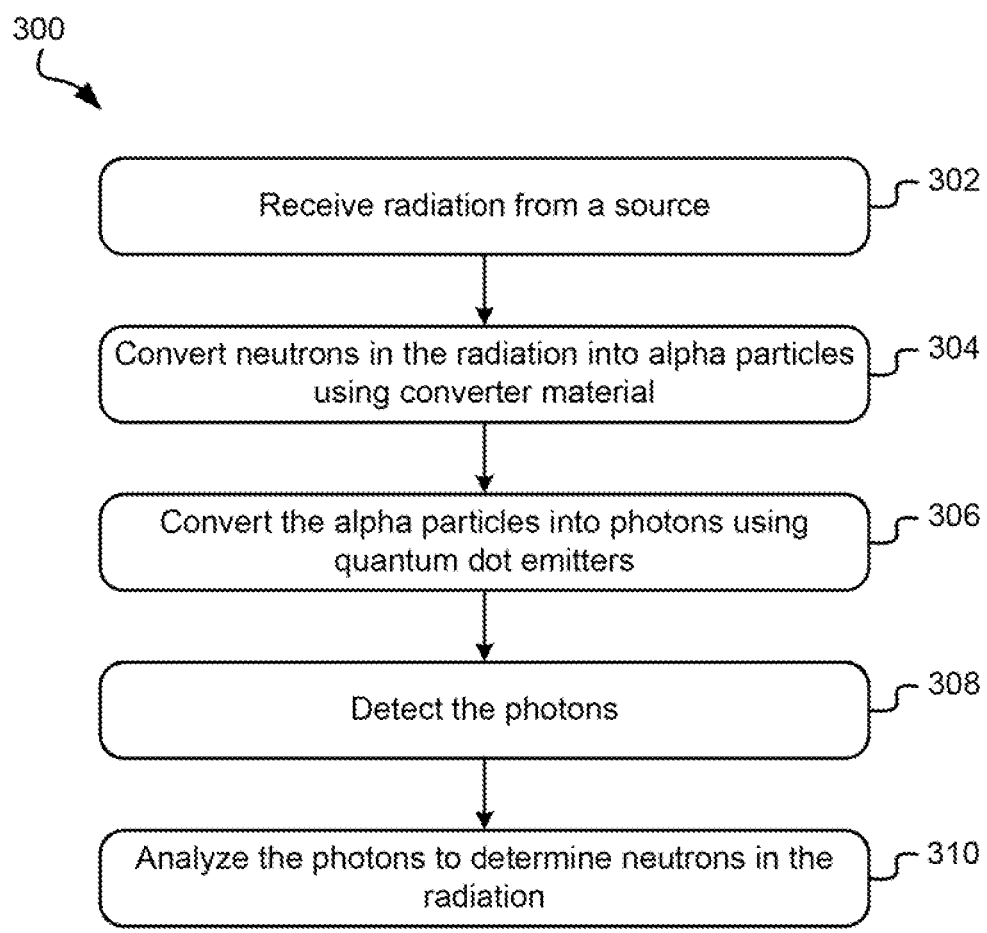
FIG. 3 is a flowchart showing a method for neutron detection, according to one embodiment.

Now referring to FIG. 3, a method 300 for producing a device for neutron detection is shown according to one embodiment. The method 300 may be carried out in any desired environment, and may be used to detect neutrons similar to the device described in relation to FIG. 2, according to one embodiment. Of course, more or less operations than those described in FIG. 3 may be used to detect neutrons, and operations described below may be combined or omitted as one of skill in the art would understand upon reading the present descriptions.

In operation 302, radiation is received from a source. The source may be an unknown radiation source, and may be contained in any container, package, storage unit, etc., such that the identity of the radiation source is not known. The radiation may be of any type, such as alpha particles, neutrons, gamma rays, etc., but method 300 is specifically adapted for detecting neutrons emanating from the radiation source, according to preferred embodiments.

In operation 304, neutrons in the radiation are converted into alpha particles using converter material. Any converter material as would be known to one of skill in the art may be used to convert the neutrons in the radiation to alpha particles.

In one approach, the converter material may comprise boron nitride (BN) nanoparticles, and the BN nanoparticles may have a greatest dimension of between about 5 nm and about 500 nm. The greatest dimension may be a diameter of the BN nanoparticles, a width, a height, a length, etc. In a further embodiment, the BN nanoparticles may comprise $^{10}B$.

In operation 306, the alpha particles are converted into photons using quantum dot emitters. Any quantum dot emitters as would be known to one of skill in the art may be used to convert the alpha particles into photons. In one embodiment, the quantum dot emitters may comprise one or more of CdSe quantum dots, ZnS quantum dots, and/or combinations thereof, such as CdSe/ZnS core shell quantum dots.

In one embodiment, the quantum dot emitters may have a greatest dimension of between about 2 nm and about 5 nm, with the greatest dimension being any of diameter, height, width, length, etc.

According to one embodiment, the photons have a wavelength in the visible light spectrum, such as a wavelength corresponding to green light, blue light, red light, violet light, etc.

In operation 308, the photons are detected. Any detection method as would be known to one of skill in the art may be used to detect the photons, such as using a PMT and/or an APD.

In operation 310, the photons are analyzed to determine neutrons in the radiation. Any analysis method may be used as would be understood by one of skill in the art upon reading the present descriptions to determine neutrons in the radiation.

In one embodiment, a multi-channel analyzer may be used to analyze the photons as would be understood by one of skill in the art upon reading the present descriptions.

There are many potential uses for the systems and methods described herein, according to various embodiments. For example, the detection systems and methods of detecting neutrons may be used for radiation detection in military applications (such as radiation detection in the field and/or in the laboratory, counter terrorism, detection of weapons of mass destruction, etc.), civilian applications (such as luggage inspection in airports and port, cargo container inspection in airports and ports, etc.), and/or medical applications (such as equipment leakage monitors, sample analysis, contamination control, hazardous materials tracking and alerts, etc.), etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A neutron detector, comprising:
a three dimensional matrix, comprising:
nanocomposite materials; and
a substantially transparent film material for suspending the nanocomposite materials,
wherein the nanocomposite materials comprise converter materials and scintillator materials, wherein the converter materials have a greatest dimension in a range from greater than 0 nm to less than or equal to about 10 nm;

a detector coupled to the three dimensional matrix, wherein the detector is configured to detect a change in the nanocomposite materials; and an analyzer coupled to the detector, the analyzer being adapted for analyzing the change detected by the detector.

2. The neutron detector as recited in claim 1, wherein the converter materials and/or the scintillator materials are physically characterized as having a nano-wire form.

3. The neutron detector as recited in claim 2, wherein the scintillator materials comprise semiconductor quantum dots, wherein the semiconductor quantum dots comprise at least one of: cadmium zinc telluride (CZT), cadmium telluride (CdTe), gallium arsenide (GaAs), and lead(II) sulfide (PbS).

4. The neutron detector as recited in claim 3, wherein the semiconductor quantum dots have a greatest dimension of between about 2 nm and about 5 nm.

5. The neutron detector as recited in claim 3, wherein the semiconductor quantum dots have an emission in a visible light spectrum.

6. The neutron detector as recited in claim 1, wherein the converter materials comprise nanoparticles consisting of boron.

7. The neutron detector as recited in claim 1, wherein the converter materials comprise BN nanoparticles having 93% enriched $^{10}B$.

8. The neutron detector as recited in claim 1, wherein the detector is an avalanche photodiode (APD), wherein the analyzer is a multi-channel analyzer.

9. The neutron detector as recited in claim 1, wherein the converter materials comprise thermal neutron converter materials and high energy neutron converter materials.

10. The neutron detector as recited in claim 1, wherein the substantially transparent film material comprises a glass or a polymer.

11. The neutron detector as recited in claim 1, wherein the converter materials comprise BN nanoparticles having 93% enriched $^{10}B$, wherein the scintillator materials comprise semiconductor quantum dots, wherein the semiconductor quantum dots have a greatest dimension of between about 2 nm and about 5 nm, wherein the semiconductor quantum dots comprise at least one of: cadmium selenide (CdSe), zinc sulfide (ZnS), CdSe/ZnS, cadmium zinc telluride (CZT), cadmium telluride (CdTe), gallium arsenide (GaAs), and lead(II) sulfide (PbS), wherein the substantially transparent film material is a resin.

12. A method for detecting neutrons, the method comprising:

receiving radiation from a source;

converting neutrons in the radiation into alpha particles using converter material, wherein the converter material comprises boron nitride (BN) nanoparticles having 93% enriched $^{10}B$;

converting the alpha particles into photons using quantum dot emitters, wherein the quantum dot emitters comprise at least one of: cadmium zinc telluride (CZT), cadmium telluride (CdTe), gallium arsenide (GaAs), and lead(II) sulfide (PbS);

detecting the photons; and analyzing the photons to determine neutrons in the radiation, wherein the converter material and the quantum dot emitters are suspended within a substantially transparent film material.

13. The method as recited in claim 12, wherein the quantum dot emitters have a size distribution of about 2%.

14. The method as recited in claim 13, wherein the quantum dot emitters have a greatest dimension of between about 2 nm and about 5 nm.

15. The method as recited in claim 12, wherein the BN nanoparticles have a greatest dimension greater than 0 nm and less than or equal to 10 nm.

* * * * *